United States Patent [19]

Brakus et al.

[11] Patent Number: 4,951,186

[45] Date of Patent: Aug. 21, 1990

[54] SINGLE-ENDED FORWARD FREQUENCY CONVERTER WITH A TRANSFORMER AND A DEMAGNETIZATION MEANS

[75] Inventors: Bogdan Brakus, Stockdorf; Herbert Heinzl, Schwabhausen, both of Fed. Rep. of Germany

[73] Assignee: Siemens Aktiengesellschaft, Berlin and Munich, Fed. Rep. of Germany

[21] Appl. No.: 286,331

[22] Filed: Dec. 19, 1988

[30] Foreign Application Priority Data

Mar. 4, 1988 [DE] Fed. Rep. of Germany ....... 3807120

[51] Int. Cl.⁵ .......................................... H02M 3/335
[52] U.S. Cl. ....................... 363/21; 363/56; 363/97
[58] Field of Search .................... 363/18–21, 363/56, 97, 131

[56] References Cited

FOREIGN PATENT DOCUMENTS 0223504 5/1987 European Pat. Off. .

OTHER PUBLICATIONS

"Television Switched-Mode Power Supply Using the TDA2640", Mullard Technical Communications, L. M. White, pp. 258–279, Jul. 1975.

Primary Examiner—William H. Beha, Jr.
Assistant Examiner—Emanuel Todd Voeltz
Attorney, Agent, or Firm—Hill, Van Santen, Steadman & Simpson

[57] ABSTRACT

A single-ended forward frequency converter which includes a transformer and a storage capacitor C1 wherein the storage capacitor C1 forms a main resonant circuit with an inductance L1 and a series circuit comprising a capacitor C3 and a resistor R1 is connected across the transformer Tr as a demagnetization means. The capacitor C3 of the RC series circuit is selected so that an additional resonant circuit is formed with the capacitor C3 and the shunt inductance of the transformer Tr and wherein the resonant circuit of this circuit is approximately the same as that of the main resonant circuit comprising the inductor L1 and the capacitor C1.

9 Claims, 2 Drawing Sheets

SINGLE-ENDED FORWARD FREQUENCY CONVERTER WITH A TRANSFORMER AND A DEMAGNETIZATION MEANS

BACKGROUND OF THE INVENTION

1. Field of the Invention

This invention relates in general to a single-ended forward frequency converter including a transformer and having a demagnetization means.

2. Description of the Related Art

A single-ended forward frequency converter is disclosed in U.S. Pat. No. 4,415,959. The transformer in this patent is intentionally propvided with a leakage inductance which forms a resonant circuit together with the storage capacitor. The electronic switch is opened at the end of a half period of the sinusoidal input current and is then in a zero current condition. In the case of the control of the electronic switch with a control circuit, the off-times during which the switch are opened circuited are varied with a constant on time. A free-wheeling diode with a following LC filter section is connected in parallel following the storage capacitor. Such free-wheeling diode becomes current conducting during every energy transmission cycle as soon as the storage capacitor is substantially discharged. The demagnetization of the transformer after the end of the on-time is accomplished with the assistance of the electronic switch or by using a suitable network.

U.S. Pat. No. 4,441,146 discloses a demagnetization means for a forward frequency converter that comprises a series conduit of a capacitor and an electronic switch with a control circuit. The demagnetization means in this patent is relatively expensive.

See also European patent application No. 0 223 504 and the article appearing in Mullard Technical Communications, Vol. 13, No. 127, Pages 258-279, July 1975 entitled "Television Switched-Mode Power Supply Using the TDA 2640 by L. M. White.

SUMMARY OF THE INVENTION

It is an object of the present invention to provide a single-ended forward frequency converter in which a demagnetization means is provided which is relatively inexpensive and wherein the demagnetization energy is optimally not dissipated.

According to the invention, the single-ended forward frequency converter is formed with a transformer which has a primary winding w1 in the primary circuit of the transformer which is connected to a DC source Q through an electronic switch S so that it can be alternately turned on and off by control pulses and a secondary winding w2 in the secondary circuit of the transformer is connected to a storage capacitor C1 through a rectifier D1 and this storage capacitor C1 forms a main resonant circuit with an inductance L1 connected in series in the primary circuit or in the secondary circuit. A demagnetization means for demagnetizing the core of the transformer after the turn on phases of the electronic switch is provided which includes at least one additional capacitor C3 connected to the secondary winding w2 of the transformer and the capacitive value of the additional capacitor C3 is selected such that an additional resonant circuit, $L_9$ which is the shunt inductance of the transformer has a resonant frequency which is substantially the same as the main resonant frequency of the resonant circuit comprising L1 and C1. The inductance connected in the primary or the output circuit may be an inductor which is provided in addition to the transformer and is directly connected to the transformer. It is preferably formed by the leakage inductance of the transformer. Due to the use of the demagnetization network practically no inductive voltage peaks occur at the electronic switch upon shut-off. An additional advantage is that the transformer receives a substantially symmetrical sinusoidal magnetization so that the core material can be optimally utilized.

Another feature of the invention is that the additional capacitor C3 is connected with a series resistor R1 to provide improved results. The resistor R1 is formed as a damping resistor for the additional resonant circuit formed by the inductance L1 and the capacitor C3.

Another feature of the invention is that the control input of the electronic switch is connected to the output of monostable flip-flop which is controlled with a clock which has a variable frequency and the output pulses of the monostable flip-flop are selected to be at about one-half the period duration of the main resonant circuit.

Another feature of the invention is that the monostable flip-flop is controlled by a voltage frequency converter which has a frequency controlled by a control gain amplifier connected to a reference voltage and to the output of the forward frequency converter.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
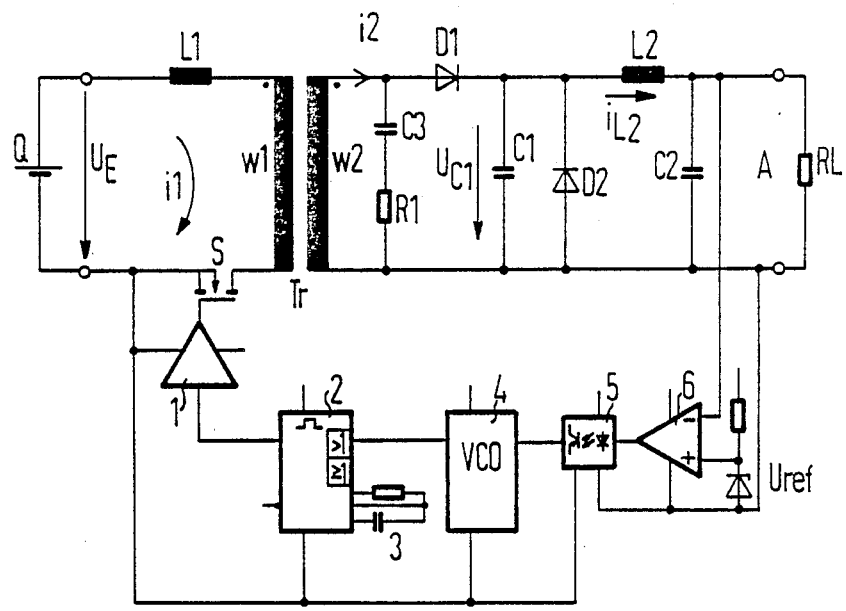
FIG. 1 is a electrical schematic diagram of the single-ended forward frequency converter according to the invention.

The single-ended forward frequency converter shown in FIG. 1 contains the transformer Tr. The primary winding W1 of the transfer Tr in the primary circuit is connected to the dc source Q through an inductor L1 and an electronic switch S. The secondary winding w2 of the transformer Tr is in the secondary circuit which is connected to a storage capacitor C1 through a rectifier D1. The inductor L1 in the primary circuit and the storage capacitor C1 form a main resonant circuit. A free wheeling diode D2 is connected in parallel to the storage capacitor C1. The free wheeling diode D2 is followed by a filter section composed of a series inductor L2 and a parallel capacitor C2. A load resistor $R_L$ is connected in parallel with the capacitor C2 which is the output of the forward frequency converter.

The series circuit formed of the capacitor C3 and the resistor R1 are in parallel with the secondary winding w2 of the transformer Tr and form a demagnetization means. This series circuit is directly and continuously connected to the winding w2 of the transformer Tr.

The capacitance of the capacitor C3 is selected such that the further resonant circuit formed by the capacitance of the capacitor C3 and the shunt inductance of the transformer Tr has approximately the same resonant frequency as the main resonant circuit.

In case the inductance of the main resonant circuit is entirely or partly in the secondary circuit, the RC series circuit is to be connected to the secondary winding w2 through such inductance.

The electronic switch S is formed by a field effect transistor which has its control electrode driven by a driver 1. The driver 1 receives the output of a monostable flip-flop 2. The duration of the output pulses of the monostable flip-flop 2 are determined by the RC-element 3 which is connected thereto and is to be selected to be one-half the duration of the main resonant circuit.

A controlled-gain amplifier 6 has its negative input connected to the output of the forward frequency converter and has its plus input connected to a reference voltage $U_{ref}$. The output of the controlled-gain amplifier 6 is conducted through an opto-coupler 5 to the voltage-frequency oscillator 4 which supplies output control pulses to the monoflop 2 which have a repetition rate which is dependent on the output voltage of the opto-coupler 5.

The output voltage is supplied to the controlled-gain amplifier 6 which compares it to the reference voltage $U_{ref}$. Its output controls the voltage-frequency oscillator 4 through the opto-coupler 5 for voltage separation. The operation is such that an upward deviation of the output voltage causes a lower frequency of the oscillator 4 and a downward deviation causes a higher frequency of oscillator 4.

The voltage-frequency oscillator 4 triggers the monostable flip-flop 2 at every output clock. The duration of the output pulses of the monostable flip-flop 2 is selected to be the duration of the current half-wave in the switching transistor. This time is primarily defined by the resonant circuit composed of L1 and C1. By contrast, the influence of the load or, respectively, of the input voltage on the time duration of respectively, of the input voltage on the time duration of the current half-wave of the electronic switch S is very small. As a result, the on-time of the switching transistor S can be kept constant over the entire rang of operation. The driver 1 drives the switching transistor S based on the output of the monostable flip-flop 2.

The function of the forward frequency converter of FIG. 1 is as follows. For the sake of simplicity, a transformer Tr having a transformation ratio of u=1 is assumed in this description. However, other transformation ratios may be used.

The resistor R1 can be neglected, i.e. shorted in a first approximation. The shunt inductance L9 or, respectively, the main inductance is a factor greater than the leakage inductance, or respectively, the inductance L1. The capacitance of the capacitor C3 is selected so that it forms a resonant circuit together with the shunt inductance L9, with the resonant frequency of this resonant circuit being defined as:

$$f_2 = \frac{1}{2\pi} \cdot \frac{1}{\sqrt{L_q C3}} \quad (1)$$

which has the same value as the resonant frequency of the first resonant circuit which is formed by the inductance L1 and the capacitance of the capacitor C1 and is defined as:

$$f_1 = \frac{1}{2\pi} \cdot \frac{1}{\sqrt{L1\, C1}} \quad (2)$$

After the current in the rectifier D1 has become zero, the magnetization current $i_m$ remains in the shunt inductance L9. This can initially continue to flow via the source $U_E$ and switch S which is still closed.

After switch 5 has been opened the magnetization current in which has been transferred into the secondary side continues to flow across the capacitor C3. The negative, simusoidal voltage which is thus formed has the same voltag-time curve as the positive voltage-time curve as when the transformer Tr is charged during the on-time. An assured operation of the transformer Tr with a substantially symmetrical magnetization is thus obtained. When the magnetization current $i_m$ has returned to its maximum value in the negative direction, then it continues to flow through rectifiers D1 and D2. Due to the far higher, impressed output current in this phase, D2 is conductive. A new cycle begins when the switch S is closed agian.

Upon re-engagement, the inductance L1 together with the resistor R1 prevents the sudden discharge of capacitor C3 via the switch S. The next switching cycle can be started immedlately after the conclusion of the demagnetization event. It is valid if $f_1 = f_2$ that:

$$f_{TAKT\,max} = f_1 = f_2 \quad (3)$$

i.e. the maximum clock frequency corresponds to the resonant frequencies.

Figure 2:
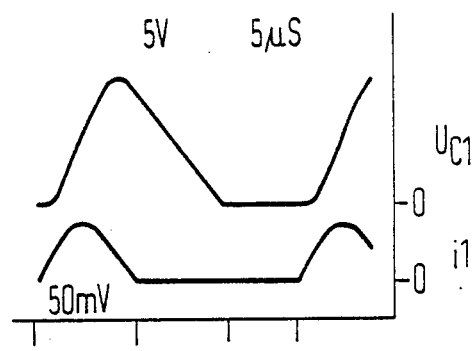
FIG. 2 is a plot of the voltage on capacitor C1 and the current in the primary circuit.
Figure 3:
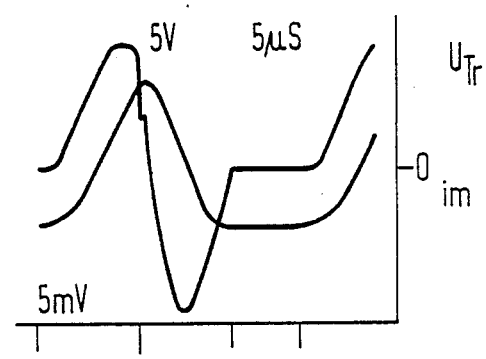
FIG. 3 is a plot of the input voltage and the magnetization current of the transformer.
Figure 4:
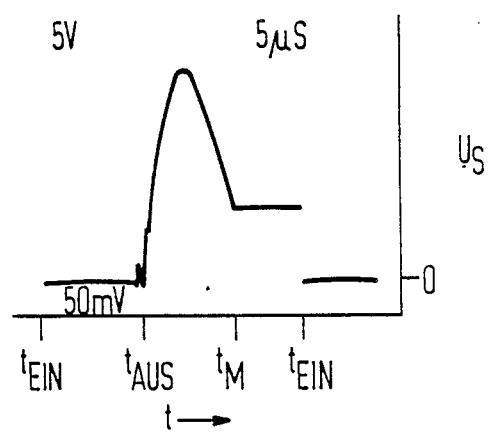
FIG. 4 is a plot of the voltage for the electronic switch as a function of time.

Since the switching events all start gradually, there is a minimum of radio frequency disturbances, as may be seen from FIGS. 2 through 4.

The pulse diagrams of FIGS. 2 through 4 show a full period of operation with all important current and voltage curves for the forward frequency converter shown in FIG. 1.

FIG. 2 shows the current curve $i_1$ in the primary circuit and the capacitor voltage $U_{C1}$ in the secondary circuit from time $t_{EIN}$ to time $t_{AUS}$, i.e. during the on circuit. From time $t_{EIN}$ to time $t_{AUS}$, i.e. during the on phase, the switch S is closed. From time $t_{AUS}$ to tme $t_{EIN}$, during the inhibit phase, the switch S is open. The switching cycle composed of the turn-on phase and inhibit phase is followed by the next switching cycle.

As FIG. 2 shows, the current $i_1$ flowing in the primary circuit during the turn-on phase has the form of a half sine wave. The inhibit phase following thereafter during which no current flows in the primary circuit lasts longer than the turn-on phase, and is about one-third longer in the illustrated example.

The voltag $U_{C1}$ appearing at the capacitor C1 rises during the turn-on phase. At the beginning of the inhibit phase and during the first half thereof in the illustrated example, the voltage $U_{C1}$ drops down to the value of the on-state voltage $U_D$ of the free wheeling diode D2. This voltage continues to exist until the end of the inhibit phase.

FIG. 3 illustrates the magnetization event. In the time period $t_{EIN} - t_{AUS}$, the voltage $U_{Tr}$, assuming that the transformation ratio u=1, which appears at the primary winding w1 of the transformer Tr is identical to the capacitor voltage $U_{C1}$ shows in FIG. 2 except for the residual voltage of the diode D1. In this time period, the shunt inductance $L_q$ of the transformer Tr builds up according to the impressed voltage of the magnetization current $i_m$, i.e. the difference between input current and output current:

$$i_m = 1/L_q \cdot \int U_{Tr}(t)\, dt$$

During the period $t_{AUS}-t_m$, the magnetization current $i_m$ oscillates from the positive maximum value to the negative maximum value, essentially following a cosine function. Accordingly, the voltage $U_{Tr}$ at the transformer Tr proceeds simusoidally in the negative direction. The voltage $U_{Tr}$ reaches its maximum negative at the zero-axis crossing of the current. Since the transformer voltage $U_{Tr}$ from time $t_{AUS}$ is lower than the voltage $U_{C1}$, the magnetization circuit and the output circuit are decoupled by the diode D1. Only at time $t_M$ does the resonant circuit $L_9$, C3 attempt to boost the transformer voltage $U_{Tr}$ in the positive direction again. This, however, is opposed by the conductive free wheeling diode D2 which, as already described substantially shorts the magnetization current $i_m$. The negative magnetization current $i_m$ that has remained constant may be seen in time $t_M - t_{EIN}$.

FIG. 4, shows the voltage curve t the switch S which is composed of the input voltage $U_E$, of the transformer voltage $U_{Tr}$ as well as of the inductor voltage $U_{L1}$. As shown in FIG. 4, the voltage at the switch S is practically zero during the turn-on phase. At the beginning of the inhibit phase, the voltage increases to a maximum value and drops to the value of the supply voltage $U_E$. The voltage at the switch S remains constant up to the end of the inhibit phase.

Together with the inductance L1, however, the capacitance of the capacitor C3 forms another, undesired resonant circuit. This has a substantially higher resonant frequency which is defined by:

$$f_3 = \frac{1}{2\pi} \cdot \frac{1}{\sqrt{L1\, C3}} \qquad (4)$$

than $f_1$ and $f_2$, since $L1 > L_1$. In order to damp this resonant circuit and to avoid high-frequency, superimposed oscillations of the frequency $f_3$, the resistor R1 is connected in series with capacitor C3. It is valid for the aperiodic limit case that:

$$R1 = 2 \cdot \sqrt{\frac{L1}{C3}} \qquad (5)$$

On the other hand, the resistor R1 does not substantially affect the demagnetization resonant circuit because the following relationships are valid:

$$L_q \gg L1 \qquad (6)$$

$$\frac{L_q}{C3} \gg \frac{L1}{C3}$$

$$R1 \ll \sqrt{\frac{L_q}{C3}}$$

Although the invention has been described with respect to a preferred embodiment, it is not to be so limited as changes and modifications are well within the intended scope as defined by the appended claims.

We claim as our invention:

1. A single-ended forward frequency converter comprising a transformer (Tr) which has a shunt inductance, a primary winding (w1) in the primary circuit of said transformer (Tr) connected to a dc source (Q) through an electronic switch (S) which can be alternately turned on and off by control pulses, and a secondary winding (w2) of the transformer (Tr) connected to a storage capacitor (C1) through a rectifier (D1), said storage capacitor (C1) forming a main resonant circuit with an inductor (L1) connected in the primary, comprising, a demagnetization mens for demagnetizing the core of the transformer (Tr) after the turn-on phases of the electronic switch (S), wherein the demagnetization means (C3) contains at least one further capacitor (C3) connected to a winding (w2) of the transformer (Tr); and the capacitance of the further capacitor (C3) is selected such that a further resonant circuit formed by the capacitance of said further capacitor (C3) and the shunt inductance of the transformer (Tr) has approximately the same resonant frequency as the main resonant circuit (L1, C1).

2. A forward frequency converter according to claim 1, characterized in that said further capacitor (C3) is connected to a series resistor (R1), so that the demagnetization means is composed of at least one RC series circuit (R1, C3).

3. A forward frequency converter according to claim 2, characterized in that the inductance of the main resonant circuit is formed by at least one leakage inductance; and the demagnetization means is composed of only one RC series circuit (R1, C3) which is connected to the secondary winding (w2) of the transformer (Tr).

4. A forward frequency converter according to claim 3, characterized in that the resistor (R1) of the RC series circuit (R1, C3) is selected as a damping resistor for an additional resonant circuit which is formed by the inductance (L1) of the main resonant circuit (L1, C1) and the capacitance of the RC series circuit (R1, C3).

5. A forward frequency converter according to claim 4 characterized in that the resistor (R1) of the RC series circuit (R1, C3) is selected so that a resonant circuit formed of the inductance (L1) of the main resonant circuit (L1, C1) and the capacitance of the RC series circuit (R1, C3) is aperiodically damped.

6. A forward frequency converter according to claim 1 or 2 or 3 or 4 or 5, characterized in that a control input for said electronic switch (S) is connected to the output of a monostable flip-flop (2) which is controlled with a clock which has a variable clock frequency, and is connected thereto with a driver (1); and the duration of the output pulses of the monostable flip-flop (2) are selected to be one-half the period of the main resonant circuit (L1, C1).

7. A forward frequency converter according to claim 6, characterized in that the monostable flip-flop (2) is controlled by a voltage-frequency converter (4) which has a frequendy which is controlled by a controlled-gain amplifier (6) which is connected to a reference voltage ($U_{ref}$) and is connected to the output of the forward frequency converter.

8. A forward frequency converter according to claim 1 or 2 or 3 or 4 or 5, characterized in that a KC filter section (L2, C2) comprising a free wheeling diode (D2) is connected between the storage capacitor (C1) and the output (A) of the frequency converter.

9. A single-ended forward frequency converter comprising a transformer (Tr) which has a shunt inductance, a primary winding (w1) in the primary circuit of said transformer (Tr) connected to a dc source (Q) through an electronic switch (S) which can be alternately turned on and off by control pulses, and a secondary winding (w2) of the transformer (Tr) connected to a storage capacitor (C1) through a rectifier (D1), said storage capacitor (C1) forming a main resonant circuit with an inductor (L1) connected in the secondary, comprising, a demagnetization means for demagnetizing the core of the transformer (Tr) after the turn-on phases of the electronic switch (S), wherein the demagnetization means (C3) contains at least one further capacitor (C3) connected to a winding (w2) of the transformer (Tr); and the capacitance of the further capacitor (C3) is selected such that the further resonant circuit formed by the capacitance of said further capacitor (C3) and the shunt inductance of the transformer (Tr) has approximately the same resonant frequency as the main resonant circuit (L1, C1).

* * * * *